United States Patent
Imada (10) Patent No.: US 9,900,513 B2
(45) Date of Patent: Feb. 20, 2018

(54) CONTROL APPARATUS, OPTICAL APPARATUS, AND LENS APPARATUS

(71) Applicant: CANON KABUSHIKI KAISHA, Tokyo (JP)

(72) Inventor: Shinji Imada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/994,420

(22) Filed: Jan. 13, 2016

(65) Prior Publication Data
US 2016/0212349 A1   Jul. 21, 2016

(30) Foreign Application Priority Data

Jan. 16, 2015 (JP) .................. 2015-006934
Dec. 16, 2015 (JP) .................. 2015-245297

(51) Int. Cl.
*H04N 5/232* (2006.01)

(52) U.S. Cl.
CPC ..... *H04N 5/23287* (2013.01); *H04N 5/23258* (2013.01); *H04N 5/23261* (2013.01)

(58) Field of Classification Search
CPC .................. H04N 5/23258; H04N 5/23261
See application file for complete search history.

(56) References Cited

U.S. PATENT DOCUMENTS

| | | | |
|---|---|---|---|
| 7,639,932 B2 | 12/2009 | Imada | |
| 9,635,265 B2 * | 4/2017 | Mukunashi | G02B 27/646 |
| 2007/0110418 A1 * | 5/2007 | Imada | G03B 5/04 396/55 |
| 2008/0094498 A1 * | 4/2008 | Mori | G03B 5/02 348/352 |
| 2009/0135261 A1 * | 5/2009 | Imamura | H04N 5/23248 348/208.99 |
| 2010/0158493 A1 * | 6/2010 | Miyasako | H04N 5/23212 396/55 |
| 2010/0271496 A1 * | 10/2010 | Obu | H04N 5/23248 348/208.4 |
| 2011/0013031 A1 * | 1/2011 | Miyasako | G02B 27/646 348/208.99 |
| 2011/0317024 A1 * | 12/2011 | Miyasako | H04N 5/23254 348/208.11 |

(Continued)

FOREIGN PATENT DOCUMENTS

| | | |
|---|---|---|
| JP | 7218967 A | 8/1995 |
| JP | 2007139952 A | 6/2007 |

*Primary Examiner* — Abdelaaziz Tissire
(74) *Attorney, Agent, or Firm* — Rossi, Kimms & McDowell LLP (57) ABSTRACT

A control apparatus includes an image stabilization controller configured to control an image stabilization of an optical apparatus by driving an image stabilizer, and a calculator configured to calculate a follow shot angular velocity for following an object based on an output from a shake detector configured to detect a shake applied to the optical apparatus and an output from a motion vector detector configured to detect a motion vector representing motion of the object. The image stabilization controller determines whether to drive the image stabilizer depending on a difference between the follow shot angular velocity and an angular velocity of the optical apparatus acquired based on the output from the shake detector.

17 Claims, 9 Drawing Sheets

(56) References Cited

U.S. PATENT DOCUMENTS

| | | | |
|---|---|---|---|
| 2014/0085492 A1* | 3/2014 | Petrescu | H04N 5/23248 348/208.1 |
| 2015/0237260 A1* | 8/2015 | Mukunashi | H04N 5/23287 348/208.11 |
| 2016/0028958 A1* | 1/2016 | Tsuchiya | G03B 5/00 348/208.4 |
| 2017/0006228 A1* | 1/2017 | Takayanagi | H04N 5/23267 |

* cited by examiner

CONTROL APPARATUS, OPTICAL APPARATUS, AND LENS APPARATUS

BACKGROUND OF THE INVENTION

Field of the Invention

The present invention relates to a control apparatus that controls driving of an image stabilizer, and more particularly to a control apparatus that controls driving of the image stabilizer in a follow shot.

Description of the Related Art

An image blur produced by influence such as a hand shake applied to a camera is corrected by detecting any fluctuation of the camera and by moving an image stabilizing lens and an image sensor (image stabilizer) in accordance with a result of this detection to change an optical axis. The fluctuation of the camera can be detected with a shake sensor and a unit mounted on the camera in principle, the shake sensor being configured to detect an angular acceleration, an angular velocity, and the like, and the unit being configured to electrically or mechanically integrate an output signal from the shake sensor to output an angular displacement. For example, Japanese Patent Laid-open No. ("JP") 7-218967 discloses a device for accurate image stabilization that drives the image stabilizer configured to shift an image capturing optical axis based on this detection information and detects the position of the image stabilizer for feedback control.

A follow shot (panning) is one of image capturing methods in a camera. This method captures an image while following, with the camera, the motion of a main object moving, for example, in a horizontal direction. A good follow shot image has a still main object in the image whereas its background flows in the moving direction of the main object. At this time, an image is captured with a slow shutter speed in general to express the dynamism of the object. Experience is required to accurately follow the motion of the object with the camera, and a slow shutter speed is likely to cause a shake. Thus, the follow shot is a relatively difficult image capturing technique for beginners. For this reason, JP 2007-139952 proposes a method for assisting a follow shot through an image stabilizer. Specifically, this method detects the moving speed of the main object on an image plane, and uses its difference from the follow shot speed by a photographer to calculate the moving speed of the main object. During an exposure, the method detects the difference between the moving speed of the main object thus calculated and the follow shot speed by the photographer, or a follow shot speed error. The method performs optical decentering to correct this error, allowing the photographer to capture a nice-looking follow shot image.

The invention disclosed in JP 2007-139952 assumes that a main object targeted by the photographer is identical to a main object recognized by the camera. However, where there are a plurality of objects, it is difficult for the camera to determine on which object the photographer is performing a follow shot mainly, and a false recognition is expected. In other cases, the moving speed of the main object may largely change, and the speed of the follow shot may not be accurately detected. In such a case, the follow shot speed error correction in the invention disclosed in JP 2007-139952 adversely causes a shake of the main object targeted by the photographer.

SUMMARY OF THE INVENTION

The present invention provides a control apparatus, an optical apparatus, and a lens apparatus which are advantageous to a follow shot image stabilization.

A control apparatus as one aspect of the present invention includes an image stabilization controller configured to control an image stabilization of an optical apparatus by driving an image stabilizer, and a calculator configured to calculate a follow shot angular velocity for following an object based on an output from a shake detector configured to detect a shake applied to the optical apparatus and an output from a motion vector detector configured to detect a motion vector representing a motion of the object. The image stabilization controller determines whether to drive the image stabilizer depending on a difference between the follow shot angular velocity and an angular velocity of the optical apparatus acquired based on the output from the shake detector.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[First Embodiment]

A description will now be given of a configuration of a camera system (optical apparatus) according to an embodiment of the present invention with reference to FIG. 1. The camera system includes a camera body 111 and an interchangeable lens 112. An image capturing light beam from an object passes through an image-pickup optical system of the interchangeable lens 112 and forms an image an image pickup unit (image sensor unit) 113 of the camera body 111. This image is photoelectrically converted by the image pickup unit 113 into an image signal. This image signal is amplified through a gain control circuit 115 and input to an A/D converter 116 where the image signal is converted from analog image data to digital image data. Reference numeral 117 denotes an image signal processing circuit that provides the image data digitalized though the A/D converter 116 with filtering, color conversion, and gamma processing. This image signal processing circuit 117 calculates a motion vector of an object image. In other words, in this embodiment, the image signal processing circuit 117 serves as a motion vector detector that detects a motion vector of the object in a screen (on an imaging plane). The image signal processed by the image signal processing circuit 117 is stored on a buffer memory 118, displayed on an LCD 119, and/or recorded on a detachable memory card 120.

An operator 121 includes switches for setting an image capturing mode of the camera, setting a record image file size, and releasing at image capturing. A camera system control MPU (camera MPU) 114 controls the above-described operation of the camera body 111, and also communicates with a lens MPU 124 through an interface circuit 122 in the camera body 111 and an interface circuit 123 in the interchangeable lens 112. This communication sends and receives various kinds of data between the digital camera body 111 and the interchangeable lens 112.

The interchangeable lens 112 includes, as part of the image-pickup optical system, a focus lens 125, a zoom lens 126, an image stabilizing lens 127, and a diaphragm 128.

The focus lens 125 is driven through a focus control circuit 129 and a focus lens drive motor 130 in accordance with a control signal from the lens MPU 124. The focus control circuit 129 includes, for example, a focus encoder that outputs a zone pattern signal and a pulse signal in accordance with movement of the focus lens, as well as the focus lens drive circuit. An object distance can be detected by this focus encoder.

The zoom lens 126 is moved through an operation of a unillustrated zooming ring by a photographer. A zoom encoder 131 outputs a zone pattern signal in accordance with a movement of the zoom lens. An image capturing magnification is obtained when the lens MPU 124 reads signals from the focus encoder and the zoom encoder 131 and reads out prestored image capturing magnification data corresponding to a combination of the object distance and a focal length.

Figure 1:
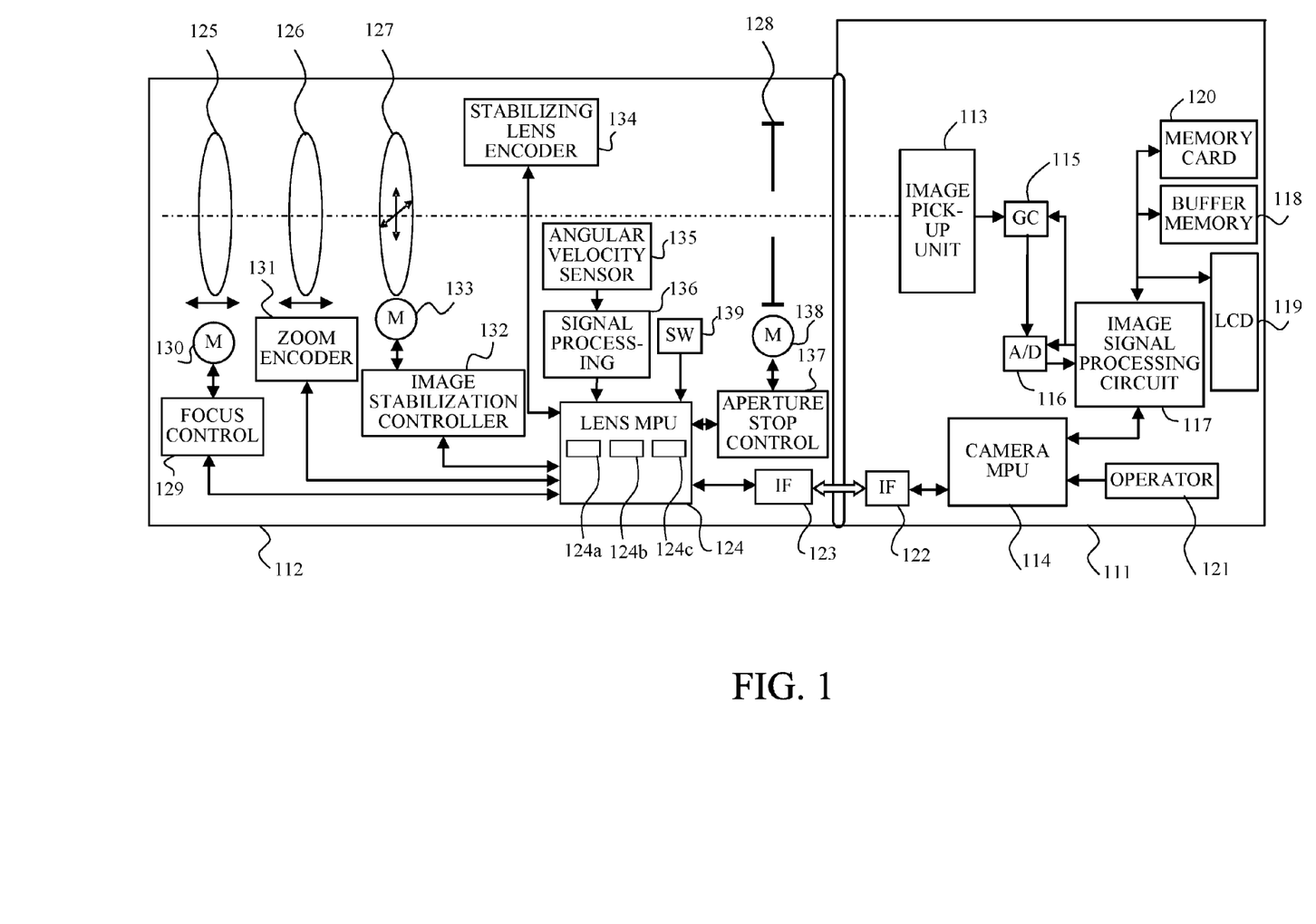
FIG. 1 is a block diagram of a camera system according to an embodiment of the present invention.

The image stabilizing lens 127 is driven in a vertical direction and a horizontal direction as illustrated with an arrow in FIG. 1 through an image stabilization control circuit (IS control circuit) 132 and a linear motor 133. Thus, the image stabilization control circuit 132 and the linear motor 133 serves as a driver that drives the image stabilizing lens 127 (optical element) in the vertical direction (first direction) and the horizontal direction (second direction orthogonal to the first direction). An image stabilization is performed as follows. A shake signal from an angular velocity sensor (detector) 135 that detects a rotational shake of the camera system (optical apparatus) is processed by a signal processing circuit 136 and input to the lens MPU 124. The angular velocity sensor 135 may be any detector as long as it serves as a shake detector that detects the shake of the optical apparatus and may be any shake sensor capable of detecting an angular acceleration and an acceleration, for example. An image stabilization controller 124a included in the lens MPU 124 calculates a stabilizing lens driving target signal and outputs, to the image stabilization control circuit 132, a driving signal in accordance with a difference between this stabilizing lens driving target signal and a stabilizing lens position signal output from a stabilizing lens encoder 134. The image stabilization is performed by feeding, back to the image stabilization control circuit 132, the stabilizing lens position signal output from the stabilizing lens encoder 134 as described above. This image stabilization control is performed for each of a pitch axis for detecting a tilt in the vertical direction and a yaw axis for detecting a tilt in the horizontal direction with respect to the camera body 111. In this manner, the lens MPU 124 serves as the image stabilization controller that controls the image stabilizing lens 127 (optical element) to drive in the vertical direction (first direction), and the horizontal direction (second direction orthogonal to the first direction). In other words, the lens MPU 124 controls a driver to drive the image stabilizing lens 127. Thus, a control apparatus that controls driving of the image stabilizing lens 127 (image stabilizer) is constituted by the lens MPU 124, and this lens MPU 124, the image stabilization control circuit 132, and the linear motor 133 are included in an image stabilization apparatus. The lens MPU 124 includes, in addition to the image stabilization controller 124a described above, a reference angular velocity calculator 124b and a determiner 124c. The reference angular velocity calculator 124b calculates (detects) an ideal follow shot (panning) angular velocity (first angular velocity corresponding to the moving speed of the object) allowing the object to be continuously followed without a shake in the screen (on the imaging plane) at follow shot image capturing. The determiner 124c determines at follow shot image capturing whether a difference between the ideal follow shot angular velocity (first angular velocity) thus calculated by the reference angular velocity calculator 124b and an angular velocity (second angular velocity) detected by the angular velocity sensor 135 is larger than a predetermined value. Operations of the reference angular velocity calculator 124b and the determiner 124c will be described later.

The diaphragm 128 is driven through an diaphragm control circuit 137 and a stepping motor 138 in accordance with a control signal from the lens MPU 124.

A switch 139 is a switch to turn on and off an image stabilization and to select an image stabilizing mode. The image stabilization mode can be selected between a normal image stabilizing mode and a follow shot operation mode.

Next follows a description of a follow shot method according to the embodiments of the present invention with reference to FIGS. 2A to 5B.

Figure 2A:
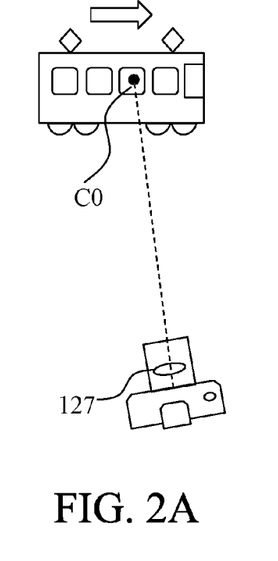
FIGS. 2A and 2B illustrate an image capturing method at follow shot image capturing according to this embodiment.
Figure 2B:
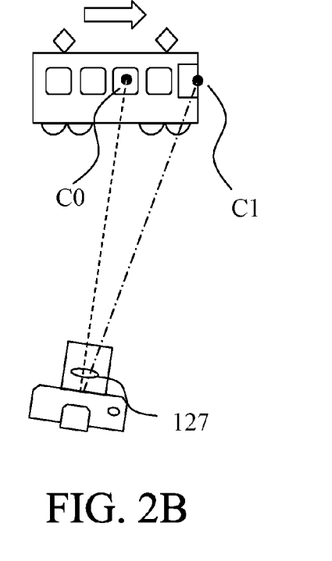

FIG. 2A and FIG. 2B illustrate motions of a passing object and the camera when an image of the object by the follow shot method is captured, in a temporal order of FIG. 2A and FIG. 2B. A follow shot can capture an image in which the motion of the object is stopped and its background flows, by swinging the camera at the moving speed of the object in an exposure duration. However, the unskilled photographer may put a target on, for example, a point C1 in FIG. 2B while intending to put the target on the center C0 of the object by panning the camera in accordance with the motion of the object.

Figure 3A:
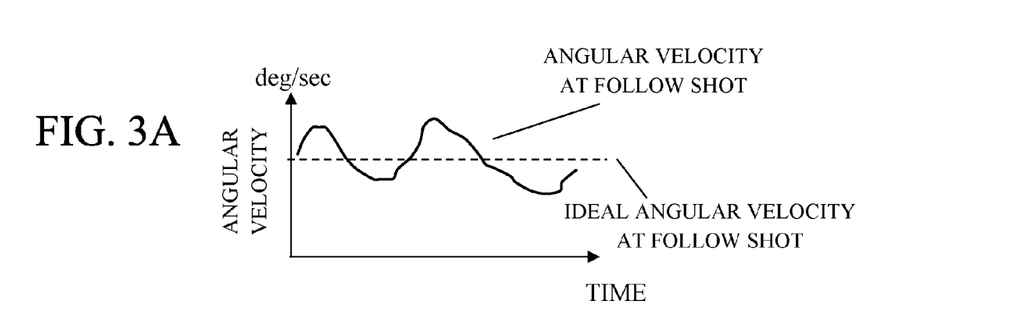
FIGS. 3A and 3B illustrate signal waveforms at the follow shot image capturing according to this embodiment.
Figure 3B:
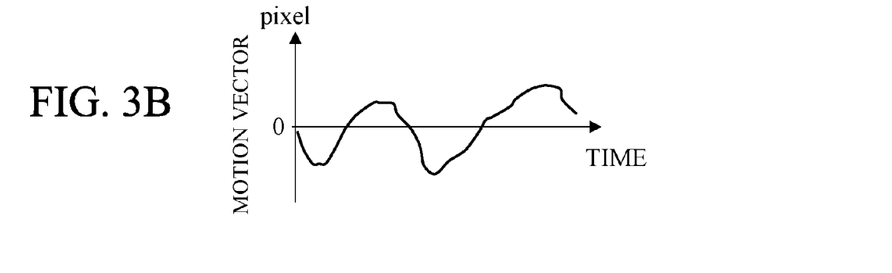

FIGS. 3A and 3B each illustrate an output from the angular velocity sensor 135 and the waveform of a motion vector amount of an object image detected by the image signal processing circuit 117 when the target is shifted at follow shot image capturing as described above. FIG. 3A illustrates an output waveform of the angular velocity sensor 135, and FIG. 3B illustrates a motion vector signal waveform. As illustrated by a dotted line in FIG. 3A, the ideal follow shot angular velocity for continuously following the object without a shake is a constant angular velocity when the object speed is constant. When the object is continuously followed without a shake, the motion vector of the object in FIG. 3B is "0". However, it is difficult to continuously follow a moving object accurately, and thus a shift from the ideal follow shot angular velocity occurs as with an actual follow shot angular velocity waveform as illustrated by a solid line in FIG. 3A. The motion vector in this case is shifted from "0" as illustrated in FIG. 3B.

Thus, driving the image stabilizing lens 127 so as to correct a shift from the ideal follow shot angular velocity can correct any shake of the object. An actual image capturing operation calculates the ideal follow shot angular velocity before exposure and drives the image stabilizing lens 127 so as to correct any shift from the ideal follow shot angular velocity during the exposure.

Figure 4A:
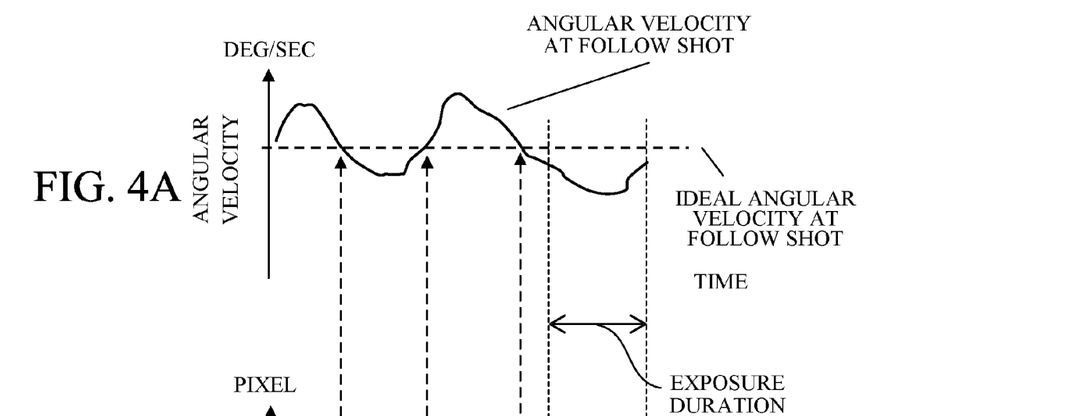
FIGS. 4A and 4B illustrate signal waveforms at the follow shot image capturing according to this embodiment.
Figure 4B:
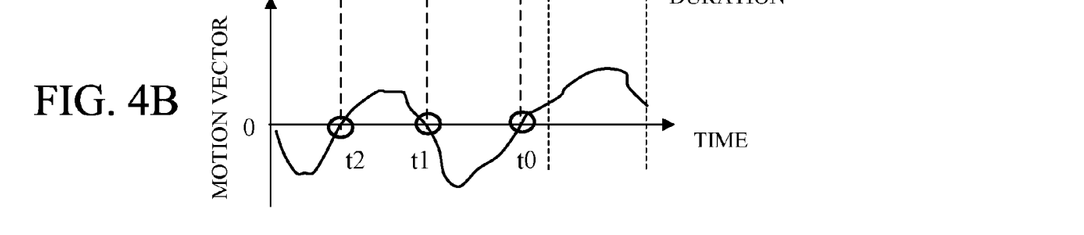

One method of calculating the ideal follow shot angular velocity is to store the output from the angular velocity sensor 135 when the motion vector is nearly "0", in other words, equal to or smaller than a predetermined value. FIGS. 4A and 4B illustrate the output waveform of the angular velocity sensor 135 and the motion vector signal waveform similarly to those in FIGS. 3A and 3B. In FIG. 4B, time from t0 to t2 is a timing at which the motion vector is equal to or smaller than the predetermined value, the output from the angular velocity sensor at this timing may be stored as the ideal follow shot angular velocity. In this case, a follow shot angular velocity stored at the timing t0 nearest to an exposure start is set as the ideal follow shot angular velocity and defined as a reference follow shot angular velocity (the first angular velocity) for a stabilization at exposure.

Figure 5A:
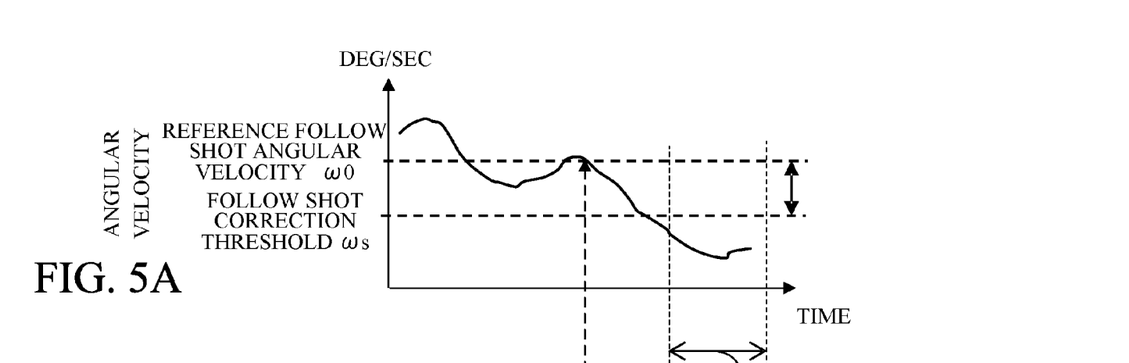
FIGS. 5A and 5B illustrate signal waveforms at the follow shot image capturing according to this embodiment.
Figure 5B:
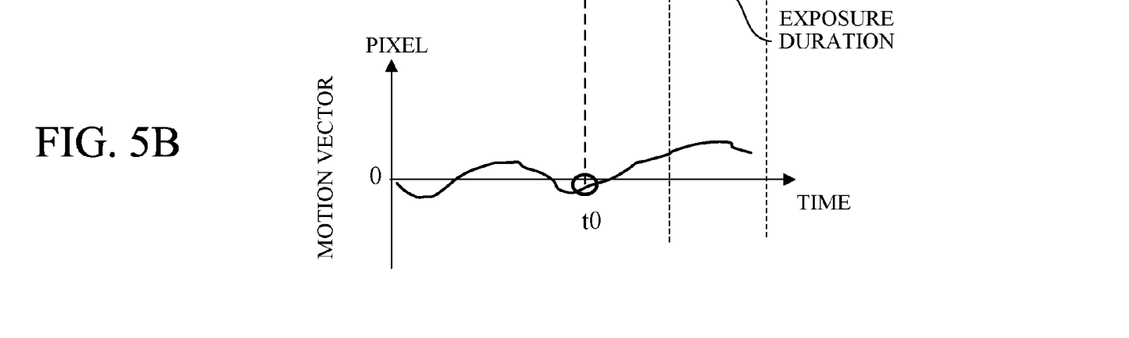

However, when an object (main object) to be panned by the photographer differs from an object determined by the image signal processing circuit 117, or when the motion vector is not accurately detected, a difference between a reference follow shot angular velocity W0 and a detected angular velocity becomes large before the exposure start as illustrated in FIGS. 5A and 5B. An operation to correct any shift from the reference follow shot angular velocity during the exposure in this state may adversely increase shake. Thus, this embodiment is characterized in that no follow shot error correction during the exposure is performed when the difference between the reference follow shot angular velocity W0 (first angular velocity) and the detected angular velocity (second angular velocity) before the exposure start is larger than a follow shot correction threshold Ws (predetermined value).

The above operation will be described with reference to flowcharts in FIGS. 6 to 9.

Figure 6:
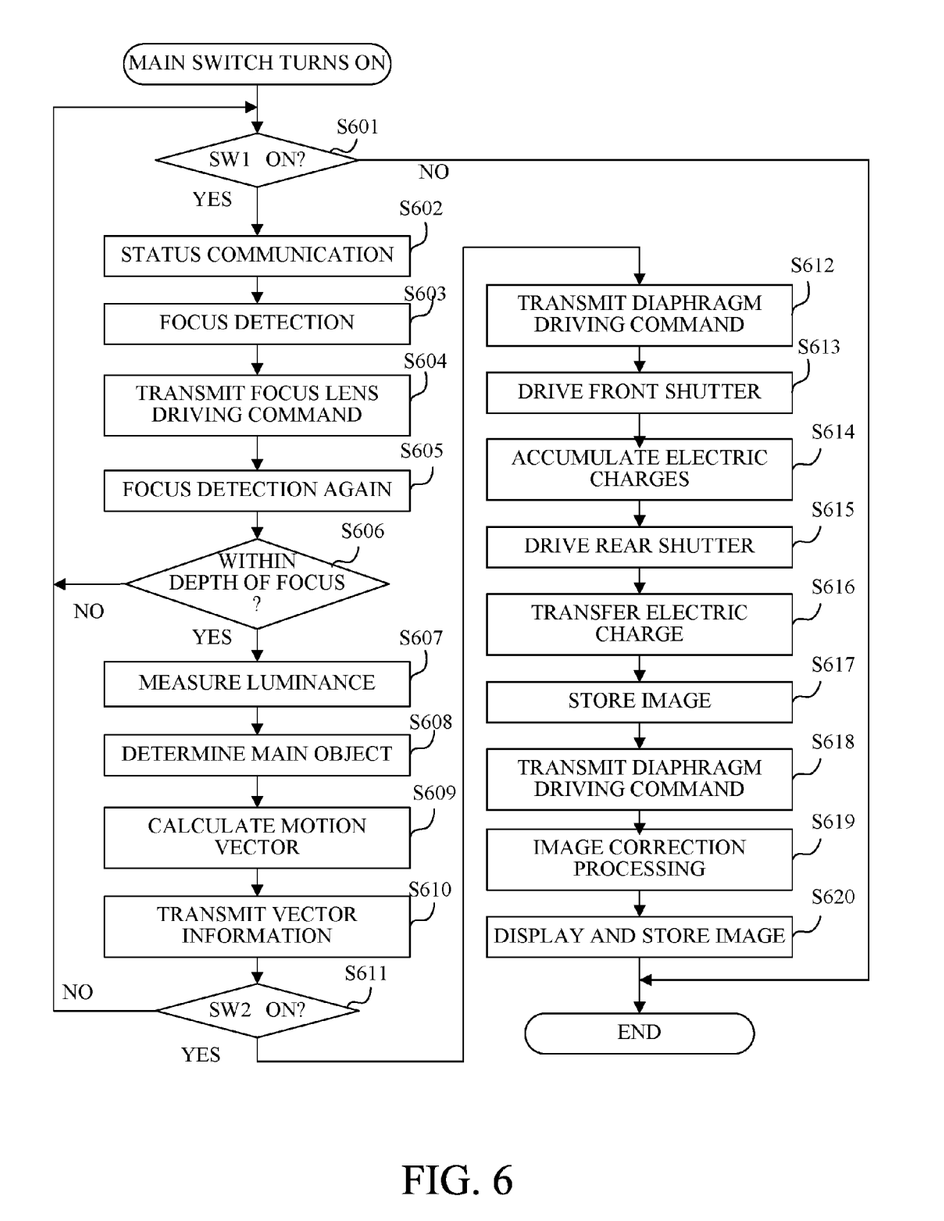
FIG. 6 is a flowchart of an operation of a camera according to this embodiment.

A description will now be given of an image capturing operation in the camera body 111 with reference to the flowchart in FIG. 6. The flows in FIG. 6 are controlled by the camera MPU 114.

When a main switch at the camera body 111 is turned on, the camera MPU 114 starts the operation at step S601.

At step S601, the camera MPU 114 determines whether a release switch at the operator 121 of the camera body 111 is pressed halfway (SW1 is ON). The camera MPU 114 proceeds to step S602 when the release switch is pressed halfway, or ends this processing when the release switch is not pressed halfway.

At step S602, the camera MPU 114 performs a camera-lens status communication with the lens MPU 124 through the interface circuits 122 and 123. At this step, the camera MPU 114 transmits to the interchangeable lens 112 the states of the camera body 111, such as SW1 turning on of the release switch, the image capturing mode, and a shutter speed, and receives the states of the interchangeable lens 112, such as the focal length, the state of the diaphragm, and the driving state of the focus lens. This camera-lens status communication illustrated in the flowchart of this embodiment is a main communication, and is performed as needed, for example, when the state of the camera is changed or when the camera needs to check the state of the lens.

At step S603, since the release switch has been half-pressed (and SW1 is turned on), the camera MPU 114 calculates a focus lens driving amount to focus on the object.

At step S604, the camera MPU 114 transmits the focus lens driving amount (focus lens driving command) to the interchangeable lens 112. This data is transmitted as a target driving pulse amount of the focus encoder, for example.

At step S605, the camera MPU 114 detects a focusing state again when driving of the focus lens ends.

At step S606, the camera MPU 114 determines whether the focus lens is located within a depth of focus, and proceeds to step S607 when the focus lens is located within the depth of focus. When the focus lens is not located within the depth of focus, the camera MPU 114 returns to step S601 and repeats the operations from step S601 to step S605.

At step S607, the camera MPU 114 obtains luminance information from the image signal processing circuit 117 and calculates an exposure time Tv and an aperture value (the diaphragm driving amount).

At step S608, the camera MPU 114 determines a main object (object) based on an image signal from the image signal processing circuit 117.

At step S609, the camera MPU 114 detects motion vector information of the main object.

At step S610, the camera MPU 114 transmits the motion vector information of the main object thus detected to the lens MPU 124.

At step S611, the camera MPU 114 determines whether the release switch at the operator 121 of the camera body 111 is fully pressed (SW2 is ON). When the release switch is fully pressed, the camera MPU 114 proceeds to step S612. When the release switch is not fully pressed, the camera MPU 114 returns to step S601 and repeats the operations at steps S601 to S610.

At step S612, the camera MPU 114 transmits the diaphragm driving amount calculated at step S607 to the interchangeable lens 112 and drives the diaphragm 128.

At step S613, the camera MPU 114 resets electric charges in the image pickup unit 113 and drives an electronic shutter.

At step S614, the camera MPU 114 exposes an object image on the image pickup unit 113 so as to accumulate electric charges.

At step S615, when an exposure time period has elapsed, the camera MPU 114 drives a unillustrated rear shutter and ends the exposure.

At step S616, the camera MPU 114 performs an electric charge transfer (readout) from the image pickup unit 113.

At step S617, an image signal thus read out is converted into digital data through the gain control circuit 115 and the A/D converter 116, and stored in the buffer memory 118.

At step S618, the camera MPU 114 transmits a diaphragm open command to the interchangeable lens 112 to set the diaphragm 128 back to a fully open state.

At step S619, the image signal is provided with image corrections such as gamma correction and compression.

At step S620, this image data thus provided with the image correction is displayed on the LCD 119 and recorded in the memory card 120, and then this series of image capturing operations ends.

Figure 8:
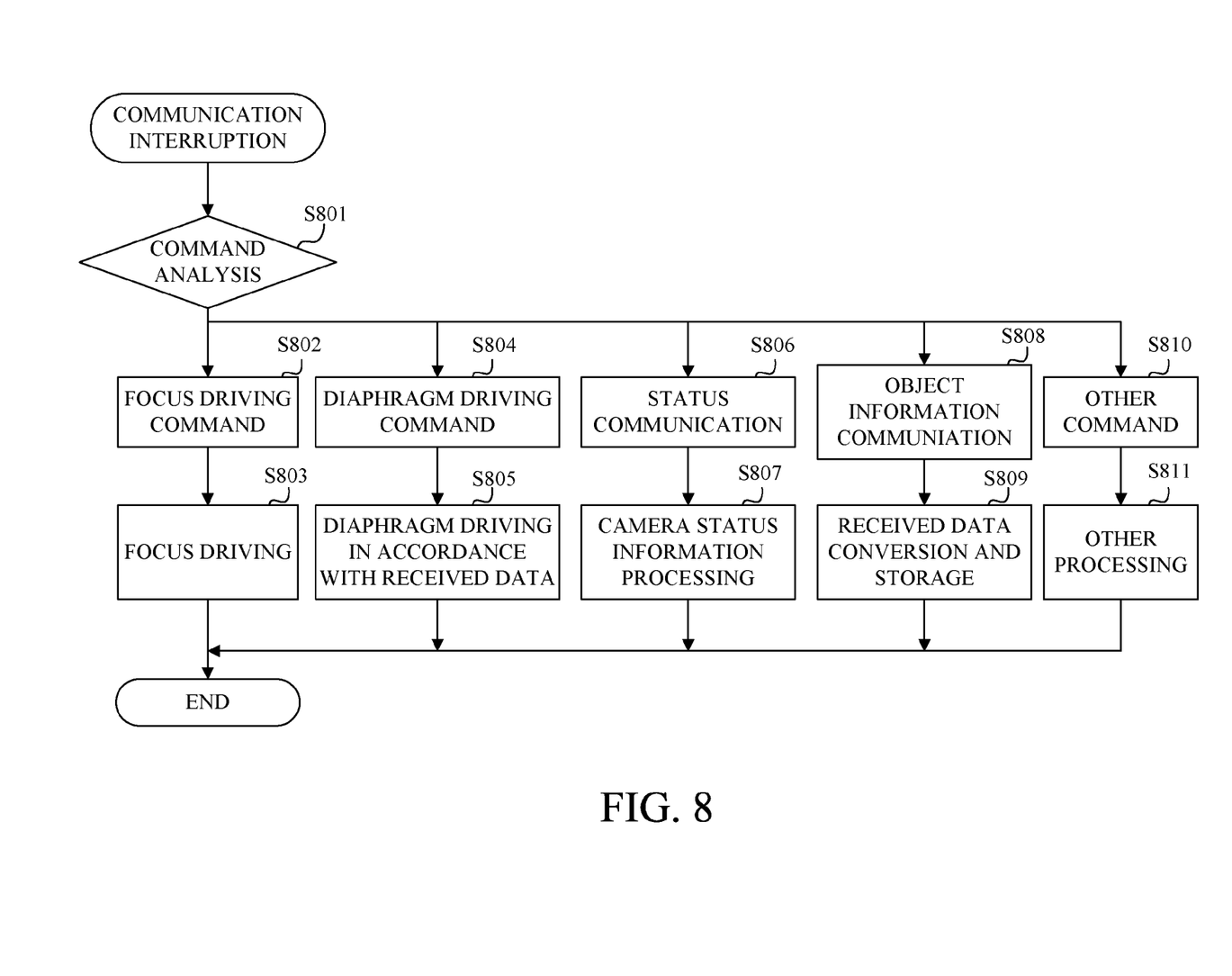
FIG. 8 is a flowchart of an operation of the interchangeable lens according to this embodiment.
Figure 9:
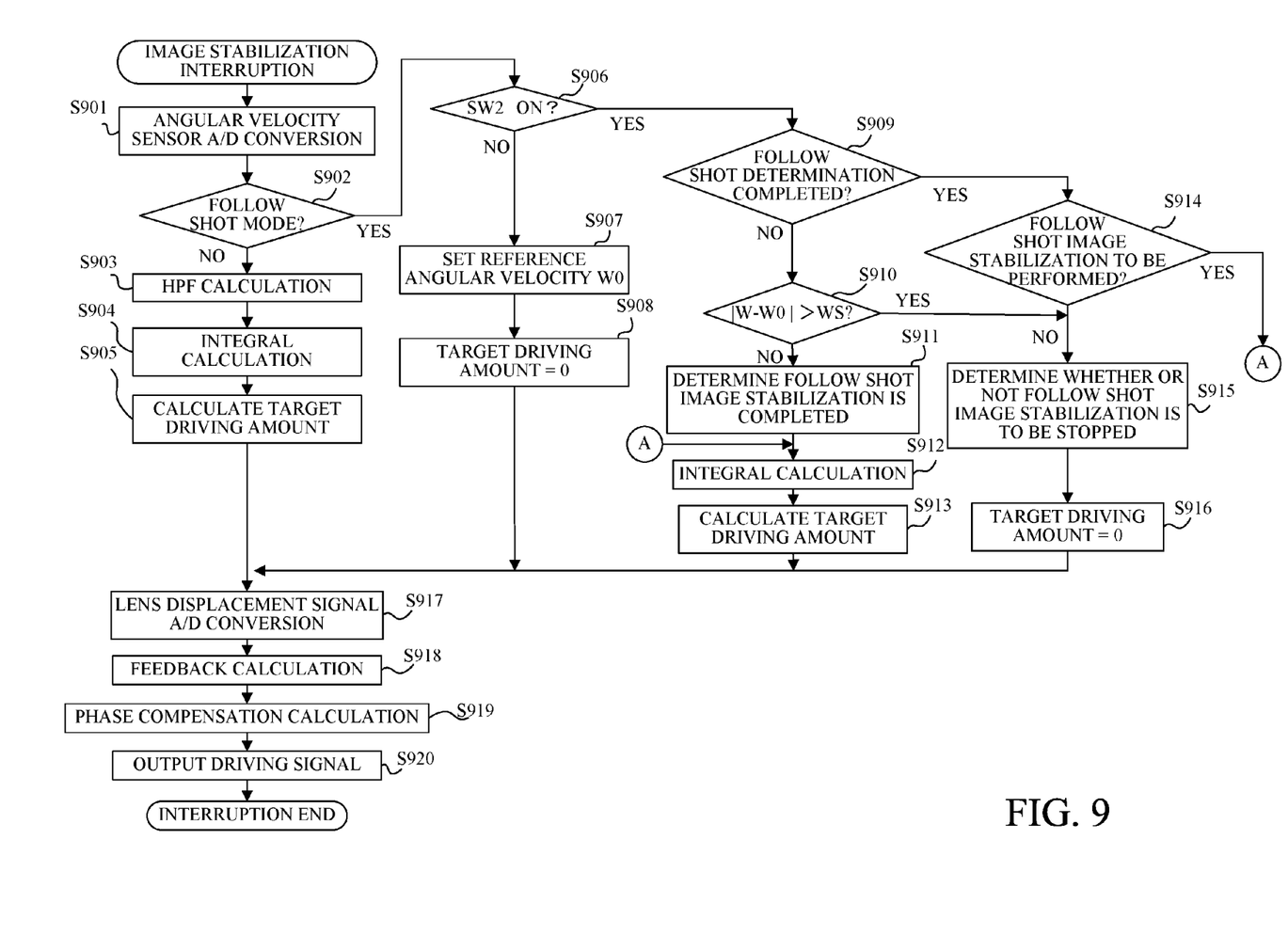
FIG. 9 is a flowchart of an image stabilization operation according to a first embodiment of the present invention.

Next, an operation at the interchangeable lens 112 will be described with reference to flowcharts illustrated in FIGS. 7, 8, and 9. The flows in FIGS. 7 to 9 are controlled by the lens MPU 124.

Figure 7:
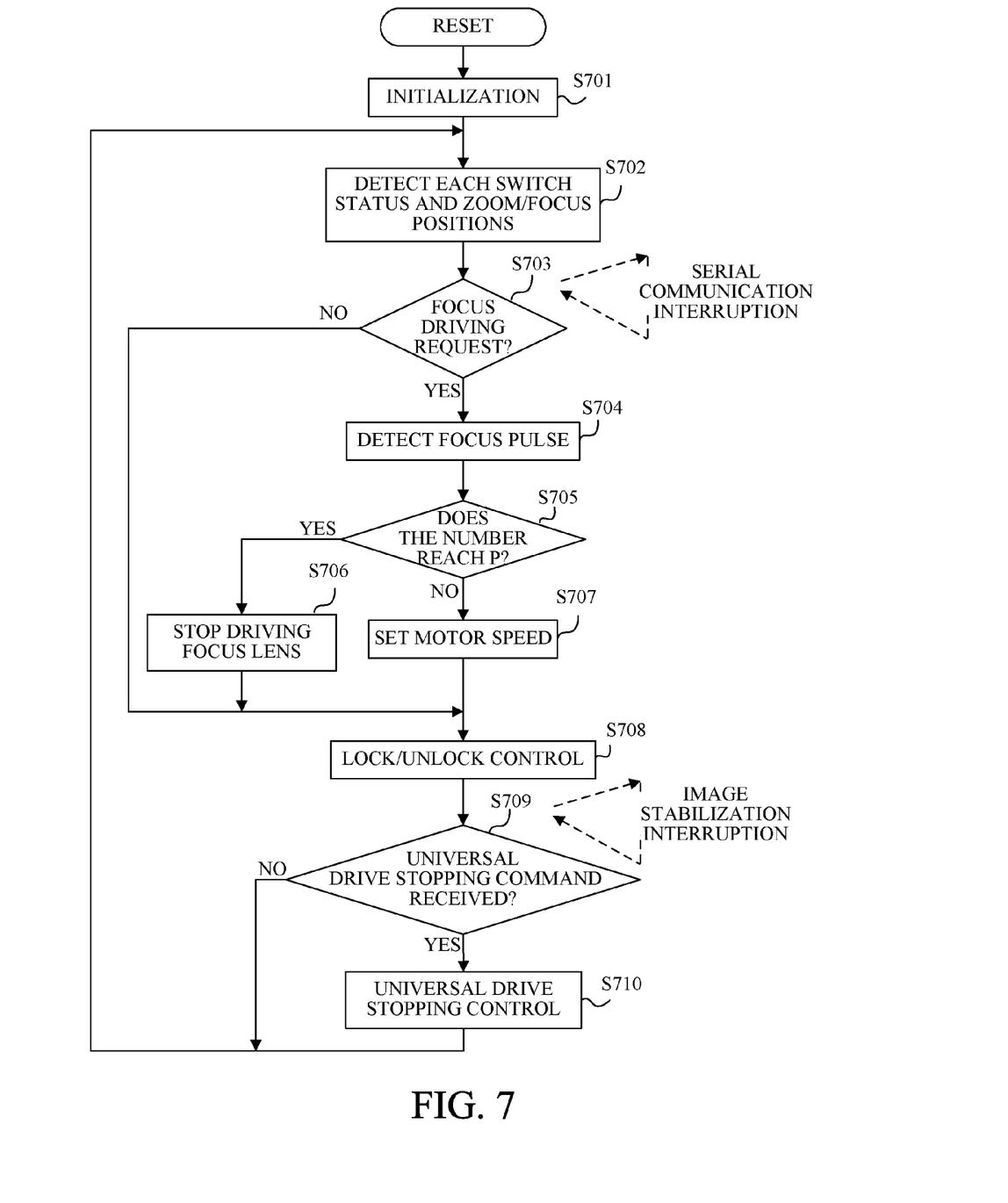
FIG. 7 is a flowchart of an operation of an interchangeable lens according to this embodiment.

When the interchangeable lens 112 is mounted on the camera body 111, a serial communication is performed from the camera body 111 to the interchangeable lens 112, and the lens MPU 124 starts an operation at step S701 in FIG. 7.

At step S701, the lens MPU 124 performs initial setting for a lens control and an image stabilization control.

At step S702, the lens MPU 124 detects the state of a unillustrated switch and zoom and focus positions. Examples of the switch include a switch for autofocus and manual focus and a switch for an image stabilization function.

At step S703, the lens MPU 124 determines whether a focus drive command communication is received from the camera body 111. The lens MPU 124 proceeds to step S704 when a focus drive command has been received, or proceeds to step S708 when the focus drive command has not been received.

At step S704, the focus drive command communication from the camera body 111 transmits a target drive amount (number of pulses) of the focus lens. Then, the lens MPU 124 detects the number of pulses of the focus encoder in the focus control circuit 129, and performs a focus drive control to drive by a target number of pulses.

At step S705, the lens MPU 124 determines whether a target number P of pulses has been reached. The lens MPU 124 proceeds to step S706 when the target number has been reached, or proceeds to step S707 when the target number has not been reached.

At step S706, since the target number of pulses has been reached, the lens MPU 124 stops driving the focus lens.

At step S707, since the target number of pulses has not been reached, the lens MPU 124 sets the speed of the focus lens drive motor 130 depending on the remaining number of pulses to drive. A lower speed is set for a smaller remaining number of pulses to drive.

At step S708, when the switch of the image stabilization function is detected to be off at step S702, the lens MPU 124 locks the image stabilizing lens 127 at an optical axis center. Then, when turning on of this switch is detected and turning on of SW1 of the release switch of the camera is detected through the camera-lens status communication, the lens MPU 124 unlocks the image stabilization lens to activate the image stabilization operation.

At step S709, the lens MPU 124 determines whether a universal drive stopping command (to wholly stop driving any actuators in the lens) has been received from the camera body 111. This universal drive stopping command is transmitted from the camera body 111 when the non-operating time period continues for a predetermined time period. The lens MPU 124 proceeds to step S710 when it receives the universal drive stopping command, or returns to step S702 until it receives the universal drive stopping command.

At step S710, the lens MPU 124 performs the universal drive stopping control. This step stops driving all actuators and sets a microcomputer into a sleep (stopping) state. This step also stops power supply to the image stabilization apparatus. After this, when the camera body 111 is operated, the camera body 111 performs a communication with the interchangeable lens 112 to cancel the sleep state.

At the request of the camera body 111 for a serial communication interruption or an image stabilization control interruption in these operations through a communication, the lens MPU 124 performs the interruption process.

The serial communication interruption process decodes communication data and controls the lens such as driving of the diaphragm and the focus lens depending on a result of the decoded data. In addition, based on the decoded communication data, turning on of SW1 or SW2, the shutter speed, and the type of the camera etc. can be determined.

The image stabilization interruption is a timer interruption that occurs every fixed period and controls image stabilizations of a pitch direction (longitudinal direction) control and a yaw direction (lateral direction).

The serial communication interruption will be described first with reference to a flowchart of FIG. 8.

Having received a communication from the camera body 111, the lens MPU 124 starts an operation at step S801.

At step S801, the lens MPU 124 analyzes the command (instruction) from the camera body 111, and bifurcates the flow into processing in accordance with each command.

Having received a focus driving command at step S802, the lens MPU 124 sets the speed of the focus lens driving motor 130 depending on a target number of drive pulses and starts driving the focus lens at step S803.

Having received the diaphragm driving command at step S804, the lens MPU 124 sets a drive pattern of the stepping motor 138 at step S805 to drive the diaphragm 128 based on the transmitted driving data of the diaphragm. Then, the lens MPU 124 outputs the set driving pattern to the stepping motor 138 through the diaphragm control circuit 137 so as to drive the diaphragm 128.

Having received the camera-lens status communication at step S806, the lens MPU 124 transmits the focal length information, the image stabilization (IS) state, and the like of the interchangeable lens 112 to the camera body 111 at step S807. The lens MPU 124 receives the status state (state of the release switch, the image capturing mode, the shutter speed, and the like) of the camera body 111.

Having received an object information receiving command at step S808, the lens MPU 124 stores received motion vector information of the object in a RAM in the lens MPU 124 at step S809.

Having received other commands such as data communication of a focus sensitivity of the lens and lens optical data communication at step S810, the lens MPU 124 performs corresponding processes at step S811.

Next, the image stabilization interruption will be described with reference to a flowchart of FIG. 9.

When the image stabilization interruption occurs during a main operation of the interchangeable lens 112, the lens MPU 124 starts an image stabilization control at step S901 in FIG. 9.

At step S901, the lens MPU 124 performs an A/D conversion for an output signal obtained by processing a signal from the angular velocity sensor 135 through the signal processing circuit 136.

At step S902, the lens MPU 124 determines whether the state of the switch 139 is a follow shot mode (first mode) or a normal image stabilizing mode (second mode). The lens MPU 124 proceeds to step S903 when the state is the normal image stabilizing mode, or proceeds to step S906 when the state is the follow shot mode.

At step S903, the lens MPU 124 performs a high-pass filter calculation to cut a low frequency component. The lens MPU 124 switches the time constant of a high-pass filter during a predetermined time period from the start of the calculation, and also performs an operation to swiftly stabilize a signal.

At step S904, the lens MPU 124 performs an integral calculation with a calculation result of the high-pass filter as an input. This integral calculation obtains angular displacement data.

At step S905, the lens MPU 124 reads out an image stabilization sensitivity in accordance with the zoom and focus positions, and calculates a target driving amount of the image stabilizing lens 127 from the angular displacement data.

Since the follow shot mode is selected, at step S906, the lens MPU 124 determines whether SW2 is turned on, in other words, an exposure operation is selected. The lens MPU 124 proceeds to step S907 when SW2 is turned off (in other words, before the exposure starts), or proceeds to step S909 when SW2 is turned on (in other words, at an exposure start timing).

At step S907, the lens MPU 124 sets the reference follow shot angular velocity W0 (first angular velocity). The reference follow shot angular velocity W0 is set based on the motion vector amount of the object and the signal from the angular velocity sensor 135. In other words, the reference angular velocity calculator 124b performs the setting by calculating (detect) the reference follow shot angular velocity W0 (first angular velocity) corresponding to the object moving speed, and storing it in a unillustrated storage unit.

At step S908, the lens MPU 124 sets the target driving amount to zero, so as to hold the image stabilizing lens 127 in an electrically neutral state if SW2 is not turned on.

At step S909, the lens MPU 124 determines whether a determination of the follow shot image stabilization is completed. The lens MPU 124 proceeds step S914 when the determination is completed, or proceeds to step S910 when the determination is not completed.

Since the determination of the follow shot image stabilization is not completed, the lens MPU 124 determines whether a difference between the reference follow shot angular velocity W0 and an angular velocity sensor signal W is larger than a predetermined angular velocity WS (predetermined value) at step S910. In other words, the determiner 124c determines, based on an output from the angular velocity sensor 135, whether the difference between the reference follow shot angular velocity W0 (first angular velocity) and an angular velocity (second angular velocity) is larger than the predetermined angular velocity WS (predetermined value). In this embodiment, the determiner 124c performs the determination at a timing when SW2 is turned on (in other words, at the exposure start timing). When the difference is larger than the predetermined value, the follow shot image stabilization is not to be performed, and thus the lens MPU 124 proceeds to step S915. When the difference is not larger than the predetermined value (equal to or smaller than the predetermined value), the lens MPU 124 proceeds to step S911 to perform the follow shot image stabilization.

At step S911, the lens MPU 124 stores that the determination of the follow shot image stabilization is completed.

At step S912, the lens MPU 124 integrates the difference between the reference follow shot angular velocity W0 and the angular velocity sensor signal W so as to calculate the angular displacement data. This result is set as the angular displacement data of a follow shot error.

At step S913, the lens MPU 124 reads out the image stabilization sensitivity in accordance with the zoom and focus positions, and calculates the target driving amount of the image stabilizing lens 127 from the angular displacement data.

At step S914, the lens MPU 124 determines whether the follow shot image stabilization is to be performed. When the follow shot image stabilization is to be performed, the lens MPU 124 proceeds to step S912 to perform the follow shot image stabilization. When the follow shot image stabilization is to be stopped, the lens MPU 124 proceeds to step S915.

At step S915, the lens MPU 124 stores that the determination that the follow shot image stabilization is not to be performed is completed.

At step S916, since the follow shot image stabilization is not to be performed, the target driving amount is set to zero to hold the image stabilizing lens 127 in the electrically neutral state. In other words, when the determiner 124c determines that a difference between the first angular velocity and the second angular velocity is larger than the predetermined angular velocity WS (predetermined value), the lens MPU 124 performs a control to restrict (stop) the driving of the image stabilizing lens 127.

At step S917, the lens MPU 124 performs an A/D conversion on a signal from the stabilizing lens encoder 134 that detects a decentering amount of the image stabilizing lens 127, and stores a result of this A/D conversion in a RAM region in the lens MPU 124.

At step S918, the lens MPU 124 performs a feedback calculation.

At step S919, the lens MPU 124 performs a phase compensation calculation to achieve a stable control system.

At step S920, the lens MPU 124 outputs a result of the calculation at step S919 as PWM to a port of the lens MPU 124, which ends the image stabilization interruption. This output is input to a driver circuit in the IS control circuit 132, and then the linear motor 133 drives the image stabilizing lens 127 accordingly to perform an image stabilization.

In this manner, the lens MPU 124 determines whether a difference between the follow shot reference angular velocity and the detected angular velocity is larger than the predetermined value at the exposure start timing, and determines whether to perform the follow shot image stabilization. Specifically, when the difference between the follow shot reference angular velocity and the detected angular velocity is equal to or smaller than the predetermined value, the lens MPU 124 performs the follow shot image stabilization during the exposure. When the difference is larger than the predetermined value, the lens MPU 124 determines that the follow shot reference angular velocity is not accurately set, and does not perform a follow shot image stabilization. The operation in this manner facilitates capturing of a nice-looking follow shot image, but stops the follow shot image stabilization when otherwise shake would be increased, thereby preventing any adverse effect.

The predetermined value is determined based on a maximum driving range of the image stabilizing lens 127. When the difference between the follow shot reference angular velocity and the detected angular velocity is too large, the driving amount of the image stabilizing lens 127 for the follow shot image stabilization is large. For this reason, the predetermined value described above may be determined based on the maximum driving range of the image stabilizing lens 127 so that the driving amount of the image stabilizing lens 127 for the follow shot image stabilization does not exceed a drivable range of the image stabilizing lens 127.

When the difference between the follow shot reference angular velocity and the detected angular velocity is larger than the predetermined value, this embodiment provides control so as to stop driving the image stabilizing lens 127 and to stop the follow shot image stabilization. When the difference described above is larger than the predetermined value, any increase of shake may be prevented by narrowing the drivable range of the image stabilizing lens 127. Reducing the driving amount of the image stabilizing lens 127 can avoid large influence of shake.

[Second Embodiment]

Figure 10:
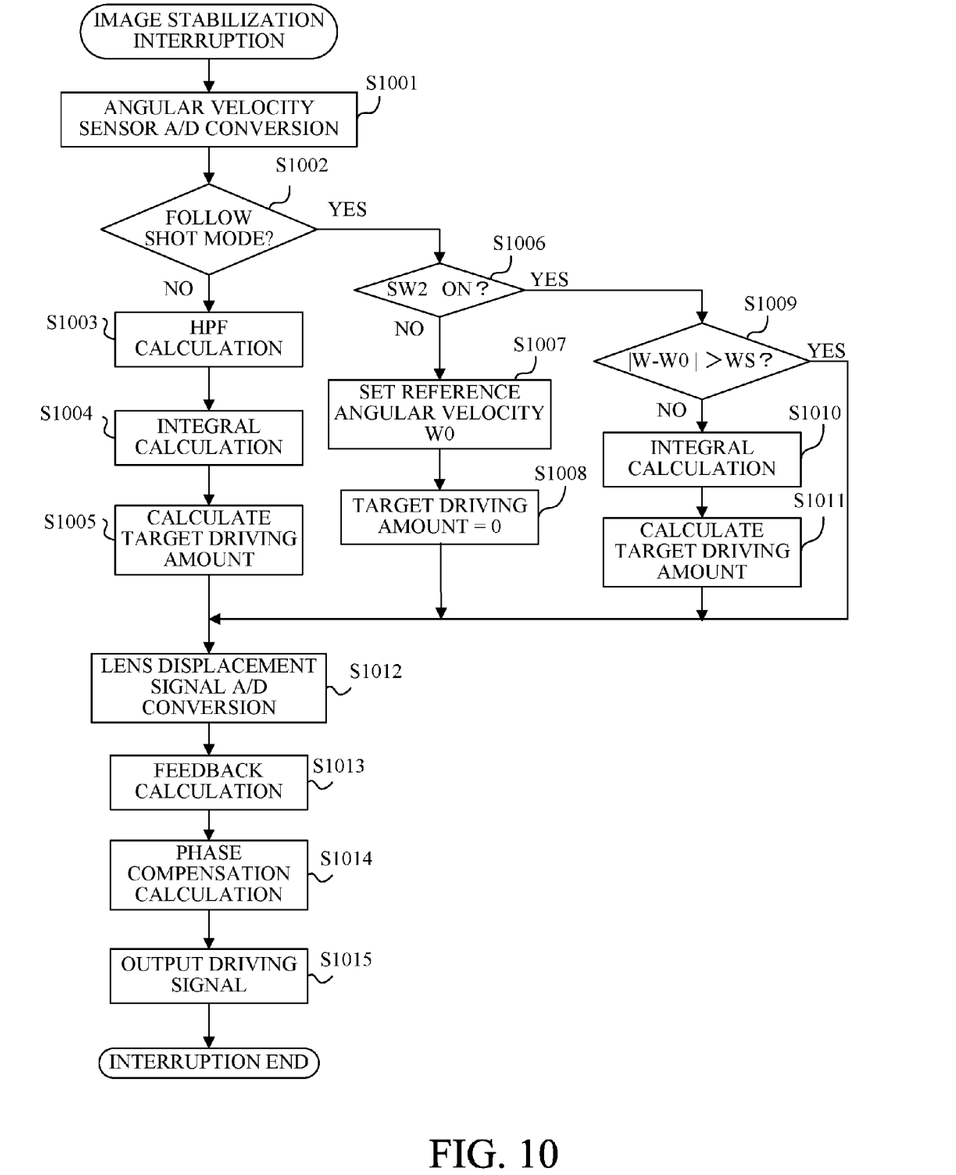
FIG. 10 is a flowchart of an image stabilization operation according to a second embodiment of the present invention.

Next follows a description of an image stabilization operation according to a second embodiment of the present invention with reference to a flowchart of FIG. 10.

The camera system has the same configuration as that in FIG. 1, and description thereof will be omitted.

When the difference between the reference follow shot angular velocity and the detected angular velocity becomes larger than the predetermined value during an exposure, this embodiment stops the follow shot image stabilization by holding the stabilizing lens at a current position without updating a target driving amount for the follow shot image stabilization.

In FIG. 10, steps S1001 to S1008, and steps S1012 to S1015 are the same as corresponding steps in the flowchart of FIG. 9, and a description thereof will be omitted.

At step S1009, the lens MPU 124 determines whether the difference between the reference follow shot angular velocity W0 and the angular velocity sensor signal W becomes larger than the predetermined angular velocity WS. In this embodiment, the determiner 124c performs the determination after SW2 turns on and before SW2 turns off (in other words, during the exposure duration). When the difference is larger than the predetermined value, the lens MPU 124 does not calculate the target driving amount because the follow shot image stabilization is stopped, and proceeds to step S1012. In other words, when the determiner 124c determines that the difference between the first angular velocity and the second angular velocity is larger than the predetermined angular velocity WS (predetermined value), the image stabilization controller 124a performs a control to restrict (stop) the driving of the image stabilizing lens 127. The image stabilization controller 124a stops driving the image stabilizing lens 127 and holds the image stabilizing lens 127 at a position at which the image stabilizing lens 127 is stopped. When the difference is not larger than the predetermined value (equal to or smaller than the predetermined value), the lens MPU 124 proceeds to step S1010 to continue the follow shot image stabilization.

At step S1010, the lens MPU 124 integrates the difference between the reference follow shot angular velocity W0 and the angular velocity sensor signal W so as to calculate the angular displacement data. This result is set as the angular displacement data of the follow shot error.

At step S1011, the lens MPU 124 reads out the image stabilization sensitivity in accordance with the zoom and focus positions, and calculates the target driving amount of the image stabilizing lens 127 from the angular displacement data. Then, the lens MPU 124 proceeds to step S1012 to control the lens for the follow shot image stabilization.

In this manner, the lens MPU 124 stops the follow shot image stabilization when the difference between the reference follow shot angular velocity and the detected angular velocity becomes larger than the predetermined value during the exposure. The operation in this manner facilitates capturing of a nice-looking follow shot image, but stops the follow shot image stabilization when otherwise shake would be increased, thereby preventing any adverse effect.

[Third Embodiment]

Figure 11:
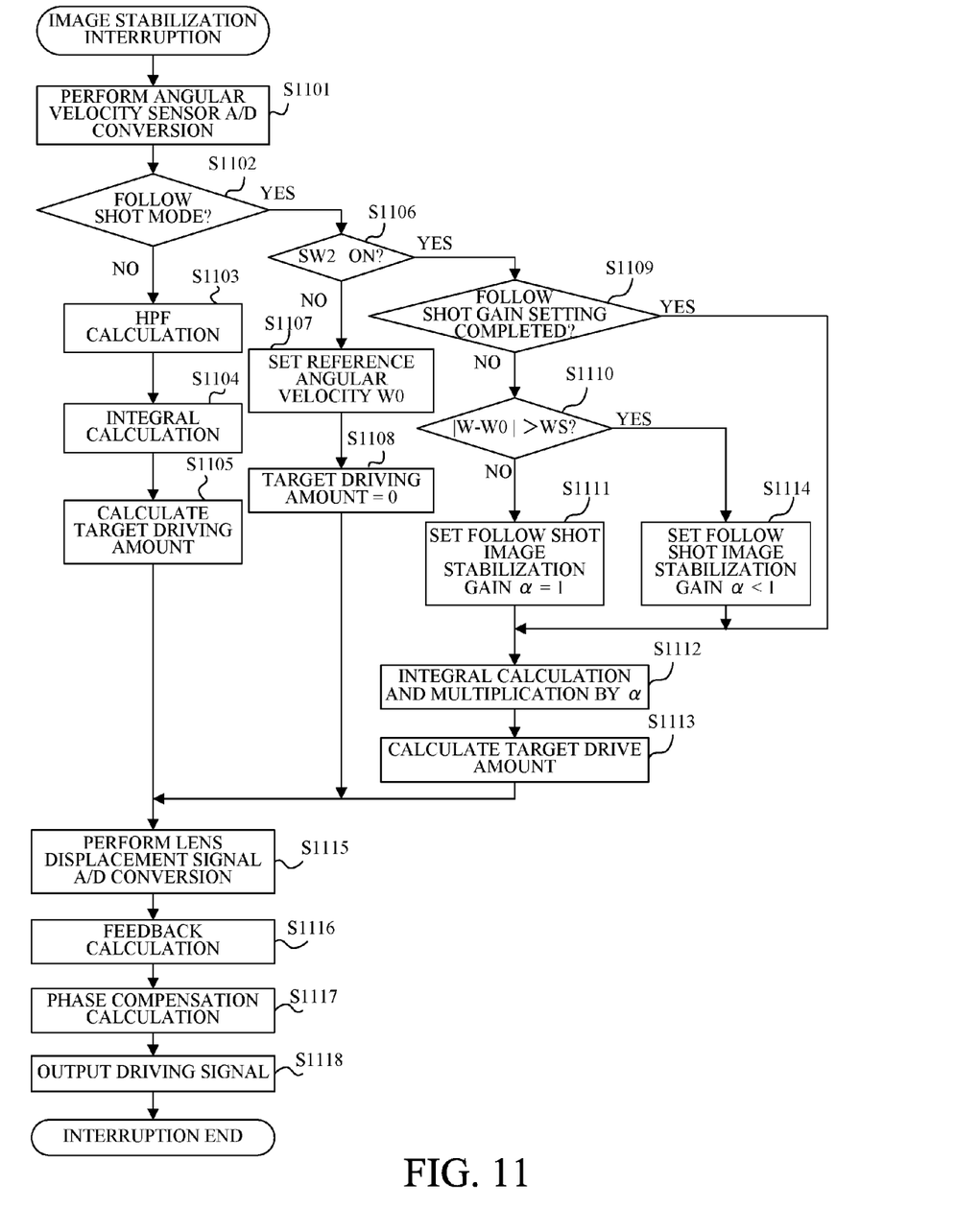
FIG. 11 is a flowchart of an image stabilization operation according to a third embodiment of the present invention.

Next follows a description of an image stabilization operation according to a third embodiment of the present invention with reference to a flowchart of FIG. 11.

The camera system has the same configuration as that in FIG. 1, and description thereof will be omitted.

This embodiment sets a gain value of the follow shot image stabilization during the exposure, depending on whether the difference between the reference follow shot angular velocity and the detected angular velocity is larger than the predetermined value at the exposure start timing. Thus, the lens MPU 124 in this embodiment includes a setter for setting the gain value of the follow shot image stabilization.

In FIG. 11, steps S1101 to S1108, and steps S1115 to S1118 are the same as corresponding steps in the flowchart of FIG. 9, and a description thereof will be omitted.

At step S1109, the lens MPU 124 determines whether a gain $\alpha$ for the follow shot image stabilization is set. The lens MPU 124 proceeds to step S1112 when the gain is set, or proceeds to step S1110 when the gain is not set.

At step S1110, the lens MPU 124 determines whether the difference between the reference follow shot angular velocity W0 and the angular velocity sensor signal W is larger than the predetermined angular velocity WS (predetermined value). The lens MPU 124 proceeds to step S1114 when the difference is larger than the predetermined value, or proceeds to step S1111 when the difference is not larger than the predetermined value (equal to or smaller than the predetermined value).

At step S1111, since the reference follow shot angular velocity is accurately set, the gain $\alpha$ of the follow shot image stabilization is set to one.

At step S1112, the lens MPU 124 integrates the difference between the reference follow shot angular velocity W0 and the angular velocity sensor signal W so as to calculate the angular displacement data. This result is set as the angular displacement data of the follow shot error. Then, the lens MPU 124 multiplies this result by the gain $\alpha$ to calculate the final angular displacement data of the follow shot error. When $\alpha=1$, the follow shot error is completely corrected. Setting $\alpha<1$ reduces a correction amount of the follow shot error.

At step S1113, the lens MPU 124 reads out the image stabilization sensitivity in accordance with the zoom and focus positions, and calculates the target driving amount of the image stabilizing lens 127 from the angular displacement data. Then, the lens MPU 124 proceeds to step S1115 to control the lens for the follow shot image stabilization.

At step S1114, having determined that the reference follow shot angular velocity has a large error, the lens MPU 124 sets the gain $\alpha$ of the follow shot image stabilization to a value smaller than one. In other words, when the determiner 124c determines the difference between the reference follow shot angular velocity W0 (first angular velocity) and the angular velocity sensor signal W (second angular velocity) is larger than the predetermined angular velocity WS (predetermined value), the image stabilization controller 124a reduces the driving amount of the image stabilizing lens 127. More specifically, the lens MPU 124 integrates the difference between the first angular velocity and the second angular velocity, and multiplies a result of the integral calculation by a gain smaller than one so as to set the driving amount of the image stabilizing lens 127 to be smaller than that when the difference between the first angular velocity and the second angular velocity is equal to or smaller than the predetermined value. $\alpha$ is set in accordance with how much the difference between the reference follow shot angular velocity W0 and the angular velocity sensor signal W is larger than the predetermined angular velocity WS (predetermined value), in other words, the size of an error. A larger error results in a smaller $\alpha$. In other words, the unillustrated setter in the lens MPU 124 performs the setting so that the gain $\alpha$ is smaller for a larger difference between the first angular velocity and the second angular velocity relative to the predetermined value.

In this manner, the lens MPU 124 determines whether the difference between the reference follow shot angular velocity and the detected angular velocity is larger than the predetermined value at the exposure start timing, and determines the follow shot image stabilization amount. Specifically, when the difference between the reference follow shot angular velocity and the detected angular velocity is equal to or smaller than the predetermined value, the lens MPU 124 performs the follow shot image stabilization during the exposure. When the difference is larger than the predetermined value, the lens MPU 124 determines that the reference follow shot angular velocity has a large error, and reduces the follow shot image stabilization amount. The operation in this manner facilitates capturing of a nice-looking follow shot image, and reduces the follow shot image stabilization when otherwise shake would be increased, thereby reducing any adverse effect.

The embodiment describes the example using a camera that allows an object image to be observed through live view image capturing, but the same effect can be obtained when vector information of the object can be calculated by a photometric sensor disposed on an optical finder.

According to the present invention, when the difference between the angular velocity detected by the angular velocity sensor 135 and the reference follow shot angular velocity calculated right before the exposure start is equal to or smaller than the predetermined value, the reference follow shot angular velocity thus calculated is determined to be appropriate. Then, during the exposure, a follow shot angular velocity error is calculated from the difference between the reference follow shot angular velocity thus calculated and the angular velocity detected by the angular velocity sensor 135, and an operation to correct the angular velocity error thus calculated can accurately correct any object shake at a follow shot.

When the difference between the angular velocity detected by the angular velocity sensor 135 and the reference follow shot angular velocity calculated right before the exposure start is larger than the predetermined value, the reference follow shot angular velocity thus calculated is determined to be inappropriate. Then, such an operation is performed to hold the image stabilizing lens at a fixed position and not to perform the follow shot image stabilization during the exposure, thereby preventing adverse production of object shake.

Thus, the present invention can provide a control apparatus, an optical apparatus, and a lens apparatus which are advantageous for the follow shot image stabilization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the image stabilization is performed by driving the image stabilizing lens 127 in the above-described embodiments, but may be performed by driving an image sensor (optical element) provided to the image pickup unit 113.

In the above-described embodiments, the lens MPU 124 included in the interchangeable lens 112 calculates the ideal follow shot angular velocity, and determines whether the above-described difference between the first angular velocity and the second angular velocity is larger than the predetermined value. Alternatively, the calculation of the ideal follow shot angular velocity and the above-described determination may be executed at the camera body 111. For example, the calculation of the ideal follow shot angular velocity and the above-described determination may be executed at the camera body 111, and a result of the determination may be transmitted to the interchangeable lens 112. The calculation of the ideal follow shot angular velocity may be executed at the camera body 111, and a result of the calculation may be transmitted to the interchangeable lens 112 to perform the determination at the interchangeable lens 112. In this manner, the calculation result of the ideal follow shot angular velocity and the above-described determination result are communicated between the lens MPU 124 and the camera MPU 114, so that the follow shot image stabilization can be appropriately performed.

Alternatively, for example, the present invention includes a case of supplying a software program that realizes the functions of the above-described embodiments, a system or apparatus including a computer capable of executing a program from a recording medium directly or through wired/wireless communication so as to execute this program.

Accordingly, the present invention is achieved by a program code supplied and installed a computer to achieve the function processing of the present invention with the computer. Thus, the present invention includes a computer program describing a procedure to achieve the function processing of the present invention.

In this case, the program may be in any form, such as an object code, a program executable by an interpreter, script data supplied to an OS, as long as having the function as a program. A recording medium for supplying a program may be, for example, magnetic recording medium such as hard disk and magnetic tape, optical/magneto-optical non-transitory computer-readable storage medium, and non-transitory semiconductor memory.

A method of supplying a program may store a computer program that realizes the present invention on a server on a computer network, and allow a client computer having a connection to download the computer program to execute.

The present invention is applicable to image pickup apparatuses such as a compact digital camera, a single-lens reflex camera, and a video camera.

This application claims the benefit of Japanese Patent Applications Nos. 2015-006934, filed Jan. 16, 2015, and 2015-245297, filed Dec. 16, 2015, which are hereby incorporated by reference herein in their entirety.

What is claimed is:

1. A lens apparatus detachably mounted on an image pickup apparatus and for communicating with the image pickup apparatus, the lens apparatus comprising:
   an image stabilizer;
   a shake detector configured to detect a shake applied to the lens apparatus; and
   an image stabilization controller configured to control image stabilization by driving the image stabilizer,
   wherein the lens apparatus receives, from the image pickup apparatus, information representing a follow shot angular velocity for following an object calculated from an output from the shake detector and a motion vector representing motion of the object acquired from an image pickup result provided by the image pickup apparatus, and
   wherein the image stabilization controller is configured to:
      drive the image stabilizer when a difference between the follow shot angular velocity and an angular velocity of the lens apparatus acquired based on the output from the shake detector is a first difference; and stop driving the image stabilizer when the difference is a second difference, which is larger than the first difference.

2. The lens apparatus according to claim 1, further comprising:
a processor configured to perform a determination on whether the difference is larger than a predetermined value or not,
wherein the image stabilization controller is configured to determine whether to drive the image stabilizer depending on a result of the determination, and
wherein the first difference is smaller than the predetermined value and the second difference is larger than the predetermined value.

3. The lens apparatus according to claim 2, wherein the processor is configured to perform the determination when the image pickup apparatus starts an exposure.

4. The lens apparatus according to claim 2, wherein the processor is configured to perform the determination between when the image pickup apparatus starts and ends an exposure.

5. The lens apparatus according to claim 1, wherein the image stabilization controller is configured to perform an image-stabilization control by driving the image stabilizer when the difference is the first difference.

6. The lens apparatus according to claim 1, wherein the image stabilizer is a lens.

7. A control apparatus comprising:
an image stabilization controller configured to control an image stabilization of an optical apparatus by driving an image stabilizer; and
a processor configured to:
calculate a follow shot angular velocity for following an object based on an output from a shake detector, which is configured to detect a shake applied to the optical apparatus, and an output from a motion vector detector configured to detect a motion vector representing motion of the object, the motion vector being acquired from an image pickup result of the object provided by an image pickup apparatus; and
perform a determination on whether a difference between the follow shot angular velocity and an angular velocity of the optical apparatus is larger than a predetermined value,
wherein the image stabilization controller is configured to change a drivable range of the image stabilizer depending on a result of the determination.

8. The control apparatus according to claim 7, wherein, when the determination is that the difference is larger than the predetermined value, the image stabilization controller is configured to narrow a drive range of the image stabilizer.

9. The control apparatus according to claim 7, wherein, when the determination is that the difference is larger than the predetermined value, the image stabilization controller is configured to drive the image stabilizer based on a value obtained by multiplying a value obtained using the difference with a gain smaller than one.

10. The control apparatus according to claim 9, wherein:
the processor is further configured to set the gain,
wherein the processor sets a smaller gain for a larger difference between the follow shot angular velocity and the angular velocity of the optical apparatus.

11. The control apparatus according to claim 7, wherein the processor is configured to performs the determination when the image pickup apparatus starts an exposure.

12. The control apparatus according to claim 7, wherein the processor is configured to perform the determination between when the image pickup apparatus starts and ends an exposure.

13. The control apparatus according to claim 12, wherein when the determination is that the difference is larger than the predetermined value, the image stabilization controller is configured to stop driving the optical element and maintain the optical element where the optical element is stopped.

14. A lens apparatus detachably mounted on an image pickup apparatus and communicating with the image pickup apparatus, the lens apparatus comprising:
an image stabilizer;
a shake detector configured to detect a shake applied to the lens apparatus;
an image stabilization controller configured to control an image stabilization by driving the image stabilizer; and
a processor configured to:
receive, from the image pickup apparatus, information representing a follow shot angular velocity for following an object calculated from an output from the shake detector and a motion vector representing motion of the object acquired from an image pickup result provided by the image pickup apparatus; and
perform a determination on whether a difference between the follow shot angular velocity and an angular velocity of the lens apparatus acquired based on the output from the shake detector is larger than a predetermined value or not,
wherein the image stabilization controller is configured to change a drivable range of the image stabilizer depending on the determination.

15. The lens apparatus according to claim 14, wherein, when the determination is that the difference is larger than the predetermined value, the image stabilization controller narrows a drive range of the image stabilizer.

16. The lens apparatus according to claim 14, wherein, when the determination is that the difference larger than the predetermined value, the image stabilization controller drives the image stabilizer based on a value obtained by multiplying a value obtained using the difference with a gain smaller than one.

17. The lens apparatus according to claim 16, wherein:
the processor is configured to set the gain,
the processor sets a smaller gain for a larger difference between the follow shot angular velocity and the angular velocity of the optical apparatus.

* * * * *